United States Patent [19]

Krüger et al.

[11] Patent Number: 5,382,146

[45] Date of Patent: Jan. 17, 1995

[54] CONTROL DEVICE FOR THE MECHANICAL THERMAL ADJUSTMENT OF THE NOZZLE OF AN EXTRUDER FOR ELONGATE PRODUCTS

[75] Inventors: Ernst Krüger, Georgsmarienhütte; Reinhard Klose, Rinteln, both of Germany

[73] Assignee: Friedrich Theysohn GmbH, Bad Oeynhausen, Germany

[21] Appl. No.: 136,114

[22] Filed: Oct. 13, 1993

[30] Foreign Application Priority Data

Oct. 16, 1992 [DE] Germany .................... 4234924

[51] Int. Cl.⁶ .................................... B29C 47/92
[52] U.S. Cl. .................................... 425/141; 425/143; 425/466; 264/40.1
[58] Field of Search ............... 425/143, 141, 466; 264/40.1, 40.7

[56] References Cited

U.S. PATENT DOCUMENTS

| | | | |
|---|---|---|---|
| 3,844,870 | 10/1974 | Donoghue et al. | 425/141 |
| 4,551,289 | 11/1985 | Schwab et al. | 425/141 |
| 4,734,922 | 3/1988 | Harris | 425/141 |
| 4,749,531 | 6/1988 | Borger et al. | 425/141 |
| 4,804,557 | 2/1989 | Anthony, Jr. et al. | 425/141 |
| 5,120,212 | 6/1992 | Reiber et al. | 425/141 |
| 5,169,649 | 12/1992 | Sikora et al. | 425/141 |

FOREIGN PATENT DOCUMENTS 0425944 5/1991 Germany .

OTHER PUBLICATIONS

Plastveranbeiter Bd. 43, Nr. 8, August, Speyer Am Rhein, pp. 37–40—42–43, Ernst Krüger, Rolf Diederichs, Reinhard Klose, 'Das Wie und Wo von Ultraschall bei der Automatiserung'.

Plastverarbeiter Bd. 34, Nr. 6, Jun. 1983, Speyer Am Rhein, p. 541, 'Mess-und Regelsystem für Breitschlitzextruder'.

*Primary Examiner*—Khanh Nguyen
*Attorney, Agent, or Firm*—Meltzer, Lippe, Goldstein

[57] ABSTRACT

The invention relates to a control device for the mechanical or thermal adjustment of the nozzle (1) of an extruder for elongate products (2). In order to eliminate components for wall thickness fluctuations in the longitudinal direction of the elongate product (2) when determining the wall thickness of the elongate product (2) over its width or its periphery, a stationary ultrasonic measuring head (3) is provided in addition to a rotating or reversing ultrasonic measuring head (4). The measured values of the two measuring heads (3, 4) are so linked to one another in an evaluating unit (5) that it is possible to derive therefrom for the controller a correcting variable which leads to an adjustment of the nozzle (1) only if the wall thickness deviations discovered are due to an adjustment error at the nozzle (1).

3 Claims, 1 Drawing Sheet

CONTROL DEVICE FOR THE MECHANICAL THERMAL ADJUSTMENT OF THE NOZZLE OF AN EXTRUDER FOR ELONGATE PRODUCTS

BACKGROUND OF THE INVENTION

The invention relates to a control device for the mechanical or thermal adjustment of the nozzle of an extruder for elongate products, having a wall thickness measuring device having at least one which reverses over the width of the elongate product or rotates around the periphery thereof and from whose measured value the controlled quantity is derived.

With the object of saving material, in the extrusion of strips or tubes an attempt is made to keep wall thickness as little as possible above the minimum wall thickness. Wall thickness fluctuations may occur both over the width and periphery of the elongate product and also in the longitudinal direction.

It is characteristic of thickness fluctuations in the longitudinal direction that the wall thickness is constant over the strip width or tube periphery in individual planes lying perpendicular to the axis of the elongate product. Such thickness fluctuations may be caused by temperature changes in the product, changes in the speed of the extruder screw, or by a change in the drawing-off speed. Such thickness fluctuations in the longitudinal direction can be levelled by suitable control steps.

Different wall thicknesses in the peripheral direction or over the width of the elongate product can have various causes. One frequent cause is the geometry of the extruder nozzle or different temperatures of the product over nozzle width or periphery. Such wall thickness fluctuations can be compensated by control steps at the nozzle. It is known to perform this either mechanically or thermally.

One difficulty in controlling wall thickness is therefore that the wall thickness is affected by nozzle adjustment, the temperature of the material to be extruded, the drawing-off speed and the screw speed. Thickness fluctuations in the longitudinal direction are superposed on thickness fluctuations in the peripheral direction. This means that the measured values of the reversing or rotating ultrasonic measuring head can be used as a controlled condition only within certain limits.

It is an object of the invention to provide a control device for the mechanical and/or thermal adjustment of an extruder nozzle, by means of which wall thickness fluctuations can be more satisfactorily levelled over the width and periphery of the elongate product.

This problem is solved according to the invention in a control device of the kind specified by at least one further stationary ultrasonic measuring head delivering its measured value to an evaluating unit which so links said measured value with the measured value of the reversing or rotating ultrasonic measuring head that the evaluating unit forms for the control of the wall thickness in the peripheral direction a signal which is free from superposed measured values of the stationary ultrasonic measuring head for exclusive wall thickness fluctuations in the longitudinal direction of the longitudinal product.

The control device according to the invention takes into account the trend of wall thickness fluctuations in the longitudinal direction by including the measured values of the stationary measuring head in the formation of the controller output, so that a rapid and high precision reaction is possible to wall thickness fluctuations over the width or periphery of the elongate product which can be levelled at the nozzle. It is true that it is also known to measure the wall thickness via a number of ultrasonic measuring heads distributed stationary over the periphery or width of the elongate product, but this fails to give a complete picture of the wall thickness over the total periphery or the whole width, since for practical reasons or reasons of space it is impossible to dispose the heads very close to one another. However, even if that were possible, the result would still not be any controlled variable of comparable quality, which is free from changes in thickness in the longitudinal direction.

SUMMARY OF THE INVENTION

Preferably with the ultrasonic measuring heads located in immediate spatial proximity, the evaluating unit performs a harmonization of their measured values. Since in this position of the measuring heads the elongate product is measured by the measuring heads at practically the same place, the measured values must be equal.

DETAILED DESCRIPTION OF THE INVENTION

Figure 1:
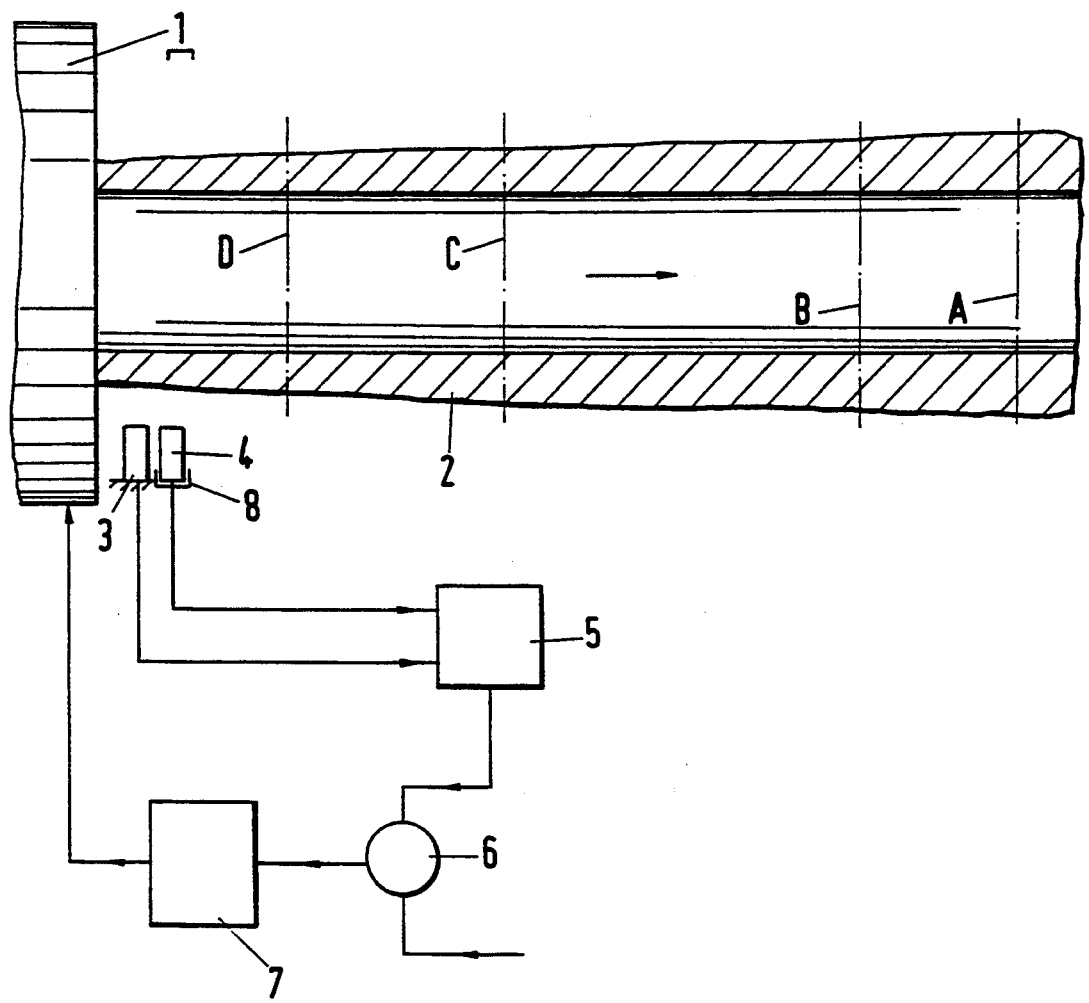
FIG. 1 illustrates a control device for adjusting a nozzle according to the present invention.

The invention will now be explained in greater detail with reference to the Figure which shows a control device for the thermal adjustment of the nozzle on a pipe extruder.

From nozzle 1 of an extruder a pipe 2 of thermal plastic material emerges whose wall thickness differs both in the longitudinal and the peripheral direction. To make the drawing clearer, these fluctuations in the wall thickness are shown in an exaggerated manner. The nozzle 1 has heating elements (not shown) which are distributed over the periphery and by means of which the thermoplastic material in the nozzle can be heated in segments, so that its flowability and therefore also the wall thickness of the pipe 2 can be influenced over its periphery. The heating elements form the final control elements of the controlled system of a control device.

In addition to the final control members (not shown), the control device comprises a measuring device, having two ultrasonic measuring heads 3, 4 and an evaluating unit 5, a comparison member 6 and a controller 7. Of the two ultrasonic measuring heads 3, 4 the ultrasonic measuring head 3 is disposed stationary, while the ultrasonic measuring head 4 is disposed to rotate in a frame 8. The measured values of the two ultrasonic measuring heads 3, 4 are delivered to the evaluating unit 5.

The control device according to the invention operates as follows:

The extruded pipe 2 has in the longitudinal and peripheral directions a different wall thickness in individual cross-sectional planes. In the cross-sectional planes A and B the wall thickness is uniform over the whole periphery in each case. It is larger in the plane B than in the plane C. This wall thickness fluctuation is characteristic of changes in the drawing-off speed and/or changes in the temperature of the material and/or changes in the screw speed. The control device is not packed on these wall thickness fluctuations.

In contrast, in the cross-sectional planes C and D the wall thicknesses are different at diametrically opposite places. However, difference in the thickness at places in alignment in the longitudinal directions in the planes C and D is equal to the difference in the planes A and B. The controller output must eliminate these differences in thickness in the longitudinal direction. To this end the measured values of the ultrasonic measuring heads 3, 4 are linked to one another in the evaluating unit 5.

Every time that the measuring head 4 is located in the immediate proximity of the measuring head 3 and then measures the wall thickness at practically the same place, equalization takes place in the evaluating unit 5, since the measured values must be identical for this place.

If the measuring place is then displaced in the direction of the cross-sectional plane B, the measuring heads 3, 4 continue to deliver equal measured values, since in each cross-sectional plane the wall thickness is identical for the whole periphery in the zone between the cross-sectional planes A and B. This means that the evaluating unit 5 delivers an output signal which is equal to the command variable supplied to the comparison member 6. The result is again that the controller 7 delivers no adjusting signal leading to a change in the adjustment of the nozzle 1.

These conditions change only when the measuring plane approaches the plane C, since in the plane C the wall thickness varies, viewed over the periphery. This applies as far as the plane D. As shown by a comparison of the wall thicknesses at aligned places of the planes C and D, the changes in wall thickness ascribable to fluctuations in the longitudinal direction is equal to that between the planes A and B. In the planes C and D, therefore, the differences in wall thickness are to be ascribed not to fluctuations in the longitudinal direction, but to fluctuations in the peripheral direction which can be levelled by steps taken at the nozzle 1. For the plane C the evaluating unit 5 so links the different measured values of the measuring heads 3, 4 to one another that the component resulting from wall thickness fluctuations in the longitudinal direction is eliminated. The comparison member 6 determines a control difference which causes the controller 7 to deliver a correcting variable to the thermal adjustment members of the nozzle 1 to increase the wall thickness in the lower zone as shown in the drawing. As shown in the drawing, however, this control operation has not yet had its full effect as far as the plane D.

We claim:

1. A control device for adjusting a nozzle of an extruder for an elongated product, comprising
    a wall thickness measuring device which measures the thickness of a wall of said elongated product;
    said wall thickness measuring device comprising at least one movable ultrasonic measuring head, at least one stationary ultrasonic measuring head and an evaluating unit;
    said movable ultrasonic measuring head measuring the wall thickness of said elongated product while moving around the periphery or reciprocating over the width of said elongated product and delivering a first measured value based on said measurement to said evaluating unit;
    said stationary ultrasonic measuring head measuring the wall thickness of said elongated product at a fixed location along the periphery or along the width of said elongated product and delivering a second measured value based on said measurement to said evaluating unit;
    said evaluating unit combining said first and second measured values so as to eliminate a component resulting from the wall thickness fluctuation in the longitudinal direction and outputting a control value for adjusting said nozzle based on the difference between said first and second measured values so as to control the wall thickness of said elongated product based on said difference thereby eliminating the fluctuations of the wall thickness in the longitudinal direction of the elongated product from control of said nozzle.

2. The control device according to claim 1, wherein said stationary and movable measuring heads are located in an immediate spatial proximity to each other, and wherein said evaluating unit equalizes said first and second measured values when said movable measuring head passes said stationary measuring head.

3. The control device according to claim 1, wherein said second measured value from said stationary ultrasonic measuring head is used for controlling fluctuations of the wall thickness in the longitudinal.

* * * * *